March 4, 1947.  T. BAILEY  2,416,811
DEVICE FOR MEASURING AND DISPENSING GRANULAR
AND PULVERULENT MATERIALS
Filed April 4, 1944   2 Sheets-Sheet 1

Theodore Bailey INVENTOR.

BY

*Victor J. Evans & Co.*

ATTORNEYS

March 4, 1947.  T. BAILEY  2,416,811
DEVICE FOR MEASURING AND DISPENSING GRANULAR
AND PULVERULENT MATERIALS
Filed April 4, 1944  2 Sheets-Sheet 2

INVENTOR.
Theodore Bailey
BY
Victor J. Evans & Co.
ATTORNEYS

Patented Mar. 4, 1947

2,416,811

UNITED STATES PATENT OFFICE 2,416,811

DEVICE FOR MEASURING AND DISPENSING GRANULAR AND PULVERULENT MATERIALS

Theodore Bailey, Habana, Cuba

Application April 4, 1944, Serial No. 529,514

1 Claim. (Cl. 222—450)

This invention appertains to measuring and dispensing devices generally, and more particularly to a type thereof that is designed for household use, in the measuring and dispensing of granular and pulverulent materials, such as sugar, flour and the like.

An object of the invention is to provide a device of this kind and one that is highly efficient in the dispensing of granular or pulverulent materials in accurately measured quantities, suitable to meet the demands of fine cookery, particularly in households, boarding houses and the like, and which is capable of being manufactured at a comparatively low cost.

Another object of the invention has to do with the provision of a device of the character mentioned, that is in the nature of an attachment for certain standard forms of containers, such as glass jars and the like, so that the same may be readily removed from and replaced on a container for the replenishment of the content of the latter and for cleaning purposes.

A further object of the invention resides in the provision of a container and a measuring and dispensing attachment combination for maintaining a plentiful supply of a granular or pulverulent material in a sanitary condition and a state of readiness for instant use at all times, the parts, container and attachment being preferably made of transparent materials, such as glass or a plastic, or a combination of both, for cheapness in manufacture and to expose the content to view for instant information as to the amount of material available for use and of the proper feed of the material into and through the attachment from the container.

With these and other objects of equal importance in view, the invention resides in the certain new and useful combination, construction and arrangement of parts, as will be hereinafter more fully described, set forth in the appended claim, and illustrated in the accompanying drawings, in which:

Figure 1:
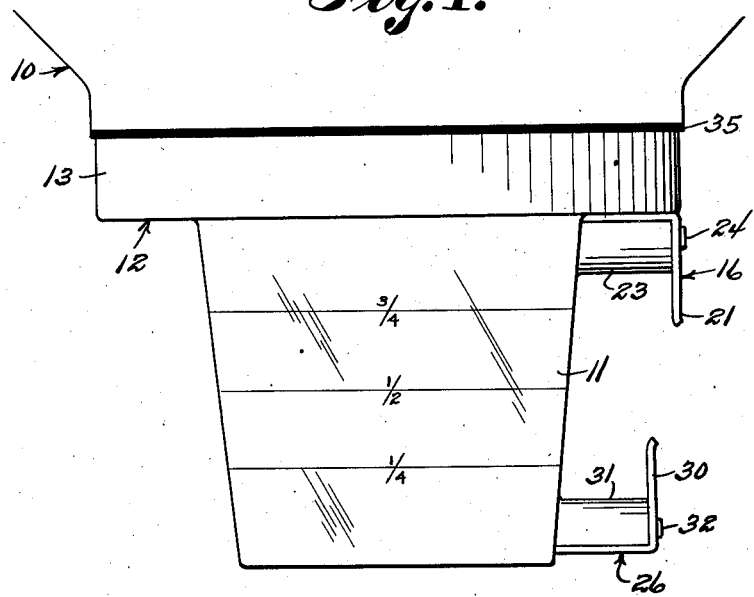
Figure 1 is a front elevation of the device, in accordance with the invention.
Figure 2:
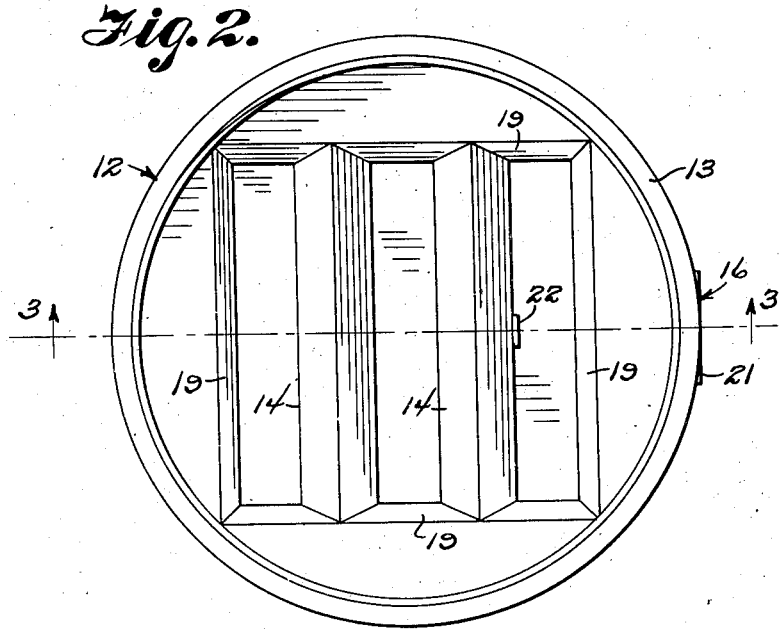
Figure 2 is a top plan view.

Referring to the drawings, wherein like characters of reference denote corresponding parts throughout the several views, the embodiment of the invention, as is exemplified therein, is comprised in a hollow body 11 that takes the form of an inverted pyramidal frustum which is open at both ends and has an annular flange 12 extending about its upper (large) end. The flange 12 is made angular in cross-section to provide an outer upstanding portion 13 that is screw-threaded at its inner side for engagement with the complementally screw-threaded mouth of a container 10. The container 10 can be of any standard or special size, square or round, and may take the form of a glass jar that is commonly employed in canning and preserving operations.

Extending across the upper open end of the body 11 is a pair of upwardly angled baffles 14 and across the lower end thereof a similar pair of baffles 15, the former being in substantial alignment with the latter; the baffles of each pair being of inverted V-shape in cross-section and disposed in substantially equidistantly spaced relation, one with respect to the other and to the side walls of the body parallel thereto, thus providing slotted discharge openings between the same.

Figure 3:
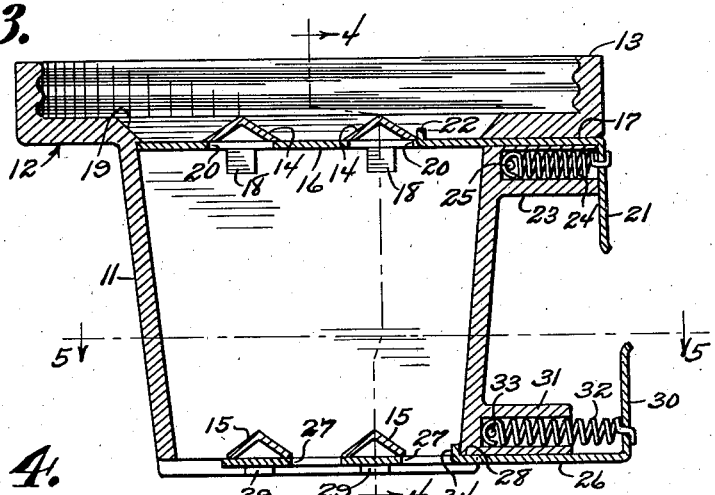
Figure 3 is a vertical section taken on the line 3—3 of Figure 2.
Figure 4:
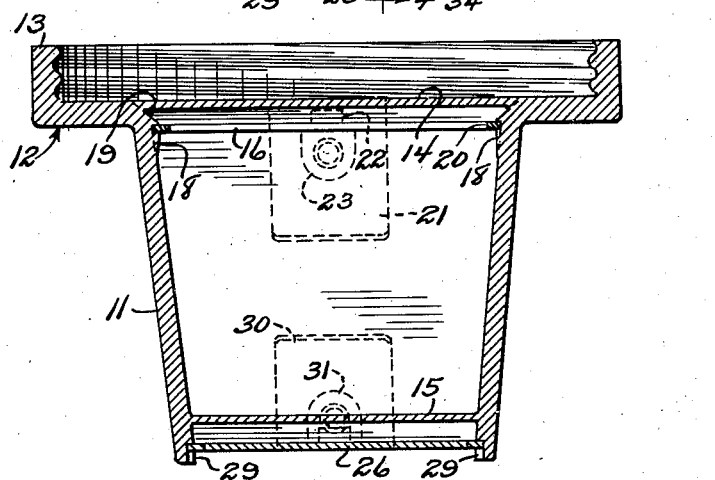
Figure 4 is a view similar to that of Figure 3, but taken on the line 4—4 of Figure 3.
Figure 5:
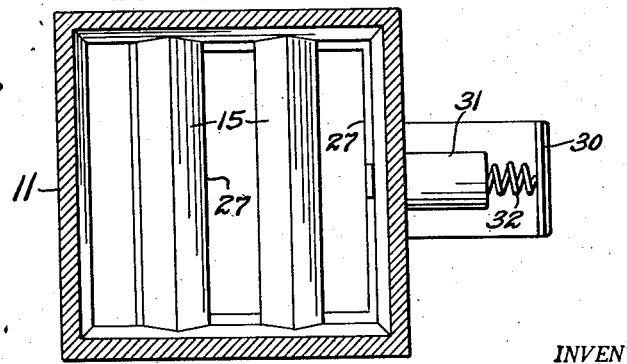
Figure 5 is a horizontal section taken on the line 5—5 of Figure 3.

Associated with the upper baffles 14 is a slide valve 16 having the form of a flat plate which is insertable through a slotted opening 17 formed horizontally of the front side of the body 11 immediately below the flange 12 and has its opposite side edges slidably supported upon shoulders 18 formed on the side walls of the body complemental thereto. The upper end of the body 11 is beveled, as at 19, along the line of its connection with the flange 12, to direct material discharged from the container 10 inwardly toward the discharge openings between the baffles 14. The valve plate 16 is transversely slotted to provide discharge openings 20 (Figure 3), which are normally out of registry with the slotted openings when the valve plate is disposed at its innermost or cut-off position. A finger piece or handle 21, for the manipulation of the valve plate 16, is formed at the front end of the valve plate by a central portion that is extended from its front edge and bent downwardly for the purpose, while a stop 22, to limit the opening movement of the valve plate, is formed by an angled portion bent upwardly from the leading edge of the discharge opening 20 that is nearest to the front side of the body 11.

Formed centrally of the front side of the body 11, immediately below the slotted opening 17, is a hollow cylindrical portion or barrel 23 to house a coiled spring 24 within its bore, which spring has its outer end connected to the downwardly angled portion of the finger piece or handle 21 and its inner end secured to a cross-pin 25 at the inner end of the barrel. Thus, the valve plate 16 will be automatically returned to cut-off position by the action of the spring 24, whenever it is manipulated to permit a portion of the content of the container 10 to discharge into the body 11.

The bottom opening of the body 11 is likewise closed by a second valve plate 26 which is formed to provide transversely disposed slotted discharge openings 27 for cooperation with the discharge openings between the lower pair of baffles 15, the valve plate 26 being slidably mounted in a horizontally slotted opening 28 formed in the front wall of the body 11 in a plane immediately below the lower edges of the baffles 15, with its opposite side edges supported upon shoulders 29 formed on the lateral side walls of the body.

The valve plate 26 is likewise provided with a finger piece or handle 30 that is formed by an extended portion of the front edge of the plate, the outer end of which portion is angularly bent upwardly, substantially as shown. A hollow cylindrical portion or barrel 31 is formed with the body 11, at the center of its front wall and immediately above the valve plate 26 to house a second coiled spring 32 that has its outer end connected to the upwardly angled portion of the finger piece or handle 30 and its inner end secured to a cross-pin 33 at the inner end of the barrel 31, by which arrangement the valve plate 26 is automatically returned to its normal cut-off portion, whenever the latter is manipulated to permit the discharge of the content of the body 11 downwardly through the discharge openings 27 which are placed in registry with those between the baffles 15 by the movement of the valve plate to its outermost position. The outward movement of the valve plate 26 is limited by a stop 34 that is formed by an upwardly angled portion bent from the leading edge of the discharge opening 27 nearest the front end of the valve plate.

For the purpose of accurately measuring fractional quantities of an amount of the granular or pulverulent content of the container 10, the body 11 is designed to hold a unit quantity thereof, for instance, an amount to level fill an ordinary teacup or the like, and has the corresponding unit of measurement, together with fractional parts of the same, for instance, ¼; ½; ¾; etched or otherwise indicated in vertical alignment on a side wall convenient for observation by the user during the manipulation of the valve plates 16 and 26.

In the use of the device as thus constructed and arranged, and after it has been secured in place on the mouth of an inverted container, the operator will first grasp the finger piece 21 of the upper valve plate 16 and pull the valve plate to its outermost position against the tension of the coil spring 24, to place its discharge openings 17 in registry with the discharge openings between the baffles 14, when a portion of the content of the container 10 will discharge by gravity into the body 11. By observing the graduations on the side wall of the body 11, the user will release the finger piece or handle 21 at the moment it is seen that the discharged material is level with a selected graduation, when the valve plate will be snapped to its cut-off position by the action of the spring 24. Now, by holding or placing a dish or other vessel (not shown) beneath the lower end of the body 11, and exerting a pull on the finger piece or handle 30 to move the lower valve plate 26 to its outermost position, the discharge openings 27 in the latter will register with those between the baffles 15 for the discharge of the measured material therethrough from the body 11 and into the underlying dish or vessel. As is shown in Figure 1, a gasket 35, such as a band of rubber or the like, is preferably placed about the mouth of the container 10 prior to the attaching of the measuring dispenser thereto.

Having thus fully described my invention, it is to be understood that various changes in design and structural details of the disclosed embodiment thereof, may be resorted to without departing from its spirit or its scope as claimed.

What I claim is:

A measuring and dispensing device for an inverted open mouth container, comprising a hollow body open at its upper and lower ends, means on the upper end of the body adapted to secure the body to the container with the open upper end of the body in registration with the mouth of the container, a plurality of inverted V-shaped baffle members formed at the upper and the lower ends, said baffle members being spaced from each other and from the sides of the hollow body forming openings therebetween and extending substantially the length of said baffle members, guide means beneath and adjacent said baffle members, valve plates slidably supported in said guide means and slidably contacting the underside of said baffle members, said valve plates extending transversely of said openings and having portions extending through one wall of the body, said valve plates having openings registering with the openings between the baffles when the valve plates are in opened position and registering with the baffles when the valve plates are in closed positions, finger pieces carried by said portions of the valve plates and extending therefrom toward each other, barrels on said wall of the body in close parallel relation to the extended portions of the valve plates, springs within the barrels with their inner ends secured to the barrel and with their outer ends secured to the finger pieces, the springs normally holding the valve plates in closed position and the finger pieces contacting with the barrels to limit the movement of the valve plates by the springs, and lugs carried by the valve plates within the body adapted to contact with said wall of the body to limit the opening movement of the valve plates.

THEODORE BAILEY.

REFERENCES CITED

The following references are of record in the file of this patent:

UNITED STATES PATENTS

| Number | Name | Date |
|---|---|---|
| 1,412,983 | Tobey | Apr. 18, 1922 |
| 376,254 | Nye | Jan. 10, 1888 |
| 783,688 | Dujat | Feb. 28, 1905 |
| 360,608 | McKinnon | Apr. 5, 1887 |
| 2,182,878 | Pipenhagen | Dec. 12, 1939 |
| 2,328,564 | Lightfoot et al. | Sept. 7, 1943 |
| 1,282,310 | Strasburger | Oct. 22, 1918 |

FOREIGN PATENTS

| Number | Country | Date |
|---|---|---|
| 20,622 | British | Nov. 1, 1893 |
| 545,539 | German | Mar. 2, 1932 |